(12) United States Patent
Armstrong et al.

(10) Patent No.: US 10,127,290 B1
(45) Date of Patent: Nov. 13, 2018

(54) SYSTEMS AND METHODS FOR DISTRIBUTING AUGMENTED-REALITY EFFECTS

(71) Applicant: Facebook, Inc., Menlo Park, CA (US)

(72) Inventors: Trevor Charles Armstrong, Renton, WA (US); Mauricio Narvaez, Stanford, CA (US); Hermes Germi Pique Corchs, Menlo Park, CA (US); Pradeep George Mathias, Mountain View, CA (US); Gwylim Aidan Ashley, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/654,564

(22) Filed: Jul. 19, 2017

Related U.S. Application Data

(63) Continuation of application No. 15/654,500, filed on Jul. 19, 2017.

(51) Int. Cl.
| | |
|---|---|
| *G09G 5/00* | (2006.01) |
| *G06F 7/00* | (2006.01) |
| *G06F 17/30* | (2006.01) |
| *H04N 21/2343* | (2011.01) |
| *H04L 29/08* | (2006.01) |
| *G06F 3/01* | (2006.01) |
| *G06T 19/00* | (2011.01) |
| *G06N 99/00* | (2010.01) |

(52) U.S. Cl.
CPC .......... *G06F 17/3053* (2013.01); *G06F 3/011* (2013.01); *G06N 99/005* (2013.01); *G06T 19/006* (2013.01); *H04L 67/125* (2013.01); *H04N 21/234381* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2011/0201362 A1* | 8/2011 | Bregman-Amitai | G06T 19/006 455/466 |
| 2013/0162676 A1* | 6/2013 | Taylor | G06T 7/004 345/633 |
| 2014/0164922 A1* | 6/2014 | Soon-Shiong | G06F 3/002 715/716 |
| 2015/0109337 A1* | 4/2015 | Hofmann | G06T 7/0002 345/633 |
| 2017/0118374 A1* | 4/2017 | Tsujiguchi | H04N 1/32133 |

(Continued)

*Primary Examiner* — Phi Hoang
(74) *Attorney, Agent, or Firm* — Baker Botts L.L.P.

(57) ABSTRACT

In one embodiment, a method for distributing an augmented reality (AR) effect may include ranking, by a computing system, a plurality of client devices based on a device capability, where a higher ranking may represent relatively better device capability. The system may identify a first subset of client devices having a first particular ranking. An AR effect may be transmitted to the first subset of client devices. The system may determine a performance score for the AR effect among the first subset of client devices. The performance score may be based on one or more performance parameters associated with the AR effect running on the first subset of client devices. The system may transmit the AR effect to a second subset of client devices when the performance score of the AR effect among the first subset of client devices satisfies a predefined threshold.

20 Claims, 6 Drawing Sheets

(56) References Cited

U.S. PATENT DOCUMENTS

2017/0162174 A1\* 6/2017 Virolainen ............... G09G 5/12
2017/0178408 A1\* 6/2017 Bavor, Jr. ............... G06F 3/013

\* cited by examiner

SYSTEMS AND METHODS FOR DISTRIBUTING AUGMENTED-REALITY EFFECTS

PRIORITY

This application is a continuation under 35 U.S.C. § 120 of U.S. patent application Ser. No. 15/654,500, filed 19 Jul. 2017.

TECHNICAL FIELD

This disclosure generally relates to systems and methods for improving performance of augmented reality effects.

BACKGROUND

Augmented reality ("AR") is a combination of a real scene viewed by a user and a virtual scene generated by a computing device that augments the scene with additional information. In other words, augmented reality provides a view of the real or physical world with added computer-generated sensory inputs (e.g., visual, audible). An augmented reality system adds virtual objects, audio and other sensory enhancements to a real world environment in real time. For example, a mobile phone with a camera may capture a real-world scene (as an image or video) and display a composite of the captured scene with computer-generated objects. The virtual objects may be, for example, two-dimensional and/or three-dimensional objects, and it may be static or dynamic. Certain virtual objects may be configured to be displayed in different locations within a scene, and not all objects may be visible initially. For example, some objects may be outside the initial field of view of the user's camera orientation, and some objects may only appear after certain triggering conditions occur.

AR effects may be experienced through a variety of ways. For example, AR effects may be experienced via 3D viewers which may allow users to see 3D models as if they actual exist in their environment. Users may also experience AR effects through 2D displays (e.g., smart phone displays, smart glasses, computer displays, etc.). The AR effects may enrich a display with augmented or contextual information. For example, the users may point their smartphones at a building to display its history or estimated value. AR effects may also be experienced through gaming, creating immersive gaming experiences that utilize the users' actual surroundings. AR effects may be displayed through, e.g., mobile or computing devices, head-mounted displays, glasses, lenses, etc.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

Downloading content packets of an AR effect may take a long time, which may negatively impact user experience (e.g., while the AR effect is being downloaded, the user may loose interest in the AR effect or grow impatient). This problem may be especially pronounced for content-rich AR effects (e.g., AR effects with multiple virtual objects, masks, etc.). Therefore, depending on the network and the user device, it may be beneficial to download content packets (e.g., the AR effect elements) incrementally and display the AR effect as soon as possible (even if incomplete), instead of waiting for all of the content packets to be downloaded before displaying the complete AR effect.

Another problem addressed by the embodiments described herein relates to the distribution of AR effects to devices that potentially lack the capabilities to adequately render the AR effects. AR effects, which may be virtual objects dynamically rendered at run time, may require substantial hardware requirements (e.g., CPU/GPU processing power, memory capacity, display, etc.) in order for the effects to appear sufficiently pleasing and responsive to the user. For example, while some mid-end to high-end devices may have adequate capabilities to support an AR effect, low-end devices may not. Users of such low-end devices may expend time and system resources to download an AR effect and be disappointed with the effect at run time due to insufficient system resources. Particular embodiments described herein relates to systems and methods for controlling the distribution of AR effects to client devices that are capable of supporting the AR effects, thereby improving overall user experience.

Yet another problem addressed by particular embodiments described herein relates to sharing and capturing photos with AR effects. In particular embodiments, an AR application may provide a live preview of a real-world scene and augment it with AR elements (e.g., putting an AR mask on a user's face). When the user decides to capture an image or video with AR effects, he/she may activate a corresponding control element (e.g., by tapping or pressing a virtual or physical button). In particular embodiments, activation of the control element may trigger a smart capture operation that saves the desired image or video with AR effects. In particular embodiments, the smart capture operation may selectively do so via "native capture" or "preview capture." When native capture is used, the AR application may, in response the user's command, request the device's camera to capture a real-world scene and augment the captured image/video with AR effects. The quality of the resulting augmented image/video may be as good as the image/video quality offered by the device. For example, the resolution of the augmented image/video may be the maximum offered by the device's camera (e.g., 12 megapixels). However, native capture may be an expensive operation in terms of resources utilized (e.g., it may be a relatively time-consuming operation and the file sizes of the photos are typically large). For certain users and/or use cases, lower quality photos may be acceptable and/or preferable. Thus, instead of using native capture, the AR application may alternatively use preview capture, which causes augmented frames used in the live preview to be saved. This avoids the extra work performed by native capture since frames that would have been produced anyways for the on-screen live preview would be used. Compared to native capture, preview capture may be faster and the resulting file size may be smaller.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
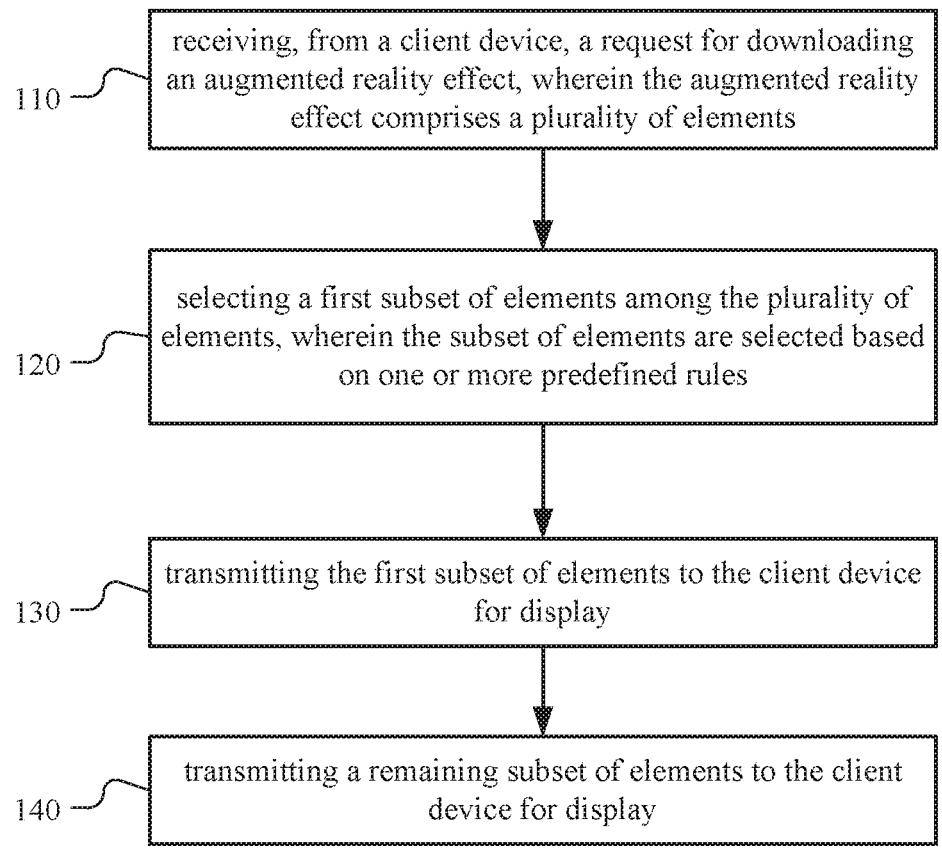
FIG. 1 illustrates an example method for incrementally distributing AR effect elements.

Particular embodiments described herein relate to systems and methods for incrementally downloading AR effect elements to minimize the time to interaction experienced by users. AR effects, which may include visual elements (e.g., images, animations, audio, object models, etc.), may have large file sizes. Slow network and network speed fluctuations may increase the time users have to wait for the AR effects to be downloaded. Consequently, downloading content packets of an AR effect may take a long time, which may negatively impact user experience (e.g., while the AR effect is being downloaded, the user may loose interest in the AR effect or grow impatient). This problem may be especially pronounced for content-rich AR effects (e.g., AR effects with multiple images or animations, such as masks). Therefore, in particular embodiments, depending on the network and the user device, content packets (e.g., the AR effect elements) may be downloaded incrementally and used to generate the AR effect as soon as possible (even if incomplete), instead of waiting for all of the content packets to be downloaded before displaying the complete AR effect. For example, an AR effect comprising several elements may be modularly grouped into several packages for transmission. When a client device at run time requests a server for an AR effect, the server may incrementally transmit the elements of the AR effect to the client device. As soon as the client device receives, for example, elements A, B, and C, those elements may be used to generate the AR effect, even if the AR effect scene is also configured to display elements D-Z. As the remaining elements are downloaded, each newly downloaded element may be used to generate the AR effect as it becomes available. From the user's perspective, the AR effect may have individual elements that appear sequentially over the course of the download. Since the user did not have to wait for downloading all elements to start interacting and/or seeing the AR effect, the time to interact is reduced.

In particular embodiments, the AR effect may be configured to support the modularization of its elements so that the AR effect and its interfaces may operate without all of the elements being available. For example, the AR effect engine may test to see whether a needed element has been downloaded, and use the element if it is available. If the element is unavailable, the AR effect may temporarily pass over the element and try if other needed elements are available. When the passed-over element is downloaded, the AR effect may then incorporate it into the AR effect that is already running. In particular embodiments, the AR effect engine may use place-holder elements (e.g., wireframes, stock image, etc.) in the AR effect to represent elements that have not yet been downloaded. In particular embodiments, users may interact with those place-holder elements as if they have been completely loaded. For instance, if the element is configured to track the user's facial movements, the place-holder element may track the user's facial movements. Then once the corresponding element has been downloaded, the place-holder element may be replaced with the downloaded element.

In particular embodiments, since the initially displayed AR effect may be incomplete, the sequence in which the elements are downloaded may be ranked or prioritized. For instance, the elements may be ranked and prioritized for downloading based on the characteristics of the AR effect and/or the configuration of the user's device. For example, an AR effect may have elements designed to be used with a front camera (e.g., a mask) and other elements to be used with a back camera (e.g., surrounding or background effects). When the user is on the back camera, then the back-camera elements of the AR effect may take precedence over the front-camera elements when the effect is being downloaded, and vice versa. In particular embodiments, when the client requests the AR effect from the server, the client device may transmit information that may be used by the server to determine how elements should be prioritized. For example, the client device may specify the current camera that is in use, the orientation of the device (e.g., based on gyroscope data), information pertaining to objects detected in the currently captured scene (e.g., whether a face is detected), and so on. In particular embodiments, the information transmitted in the request may be determined by the AR effect engine, which knows which types of information may be relevant in determining which elements of the effect may be needed based on the current viewing conditions and/or device configurations. In particular embodiments, the client device may periodically update the information transmitted to the server while elements are being downloaded so that the server may dynamically determine which elements are most needed given the most recent information and prioritize the transmission accordingly. In particular embodiments, certain AR effects may have a default viewing configuration, in which case the elements associated with the default viewing configuration may be prioritized over other elements that may not be needed immediately. For example, an AR effect may be configured so that elements A, B, and C are displayed in the initial scene. In situations where this information is known, the system may prioritize these elements over others.

In particular embodiments, a machine-learning algorithm may be used to determine which elements should be downloaded first. In particular embodiments, the machine-learning algorithm may evaluate usage patterns of the user and/or other users and predict which elements of the AR effect may be the most desirable for the requesting user. For example, for a Justice League AR effect with seven characters, the machine-learning algorithm may determine that the requesting user would likely prefer Batman as the favorite character. Therefore, elements associated with Batman may take precedence over elements associated with other super heroes. This prediction may be based on the user's historic preference using the AR effect or similar AR effects, or based on a classification of the requesting user with other similar users who are known to prefer Batman. In particular embodiments, the classification may be based on features associated with the users, such as age, gender, or any other features. In particular embodiments, the user features may be obtained from a social-networking system of which the users are members. In particular embodiments, the machine-learning model may also base its prediction on historic usage patterns of the AR effects from other users to determine, for example, which elements of the AR effect (e.g., Justice League characters) are most popular. In particular embodiments, common elements (e.g., fonts, logos, etc.) that are shared between different AR scenes in an AR effect or elements that are commonly displayed may be prioritized during downloading. For example, if the Justice League AR effect has seven characters and each character has the same logo, the server may detect the shared element and prioritize it for downloading. The client device may store and reuse the logo (e.g. via a caching mechanism) to avoid downloading the logo seven times. In particular embodiments, the AR developer may also predetermine one or more elements as core elements of the AR effect to be downloaded first. The core elements may then be prioritized for downloading by the server along with other prioritized elements of the AR effect which may be determined by server or by the user's preference or other users' preferences.

FIG. 1 illustrates an example method 100 for incrementally distributing AR effect elements. The method may begin at step 110, where one or more computing devices associated with a system for distributing AR effects (e.g., an AR effect server, an application server, a social-networking system 460, etc.) may receive a request for downloading an AR effect. The request may be received from a client device of a user of the system. In particular embodiments, the AR effect may include a plurality of elements. As an example and not by way of limitation, a justice league AR effect may include several elements including: characters, fonts, logos, visual effects, audio contents, etc. Although this disclosure describes receiving a request for downloading an AR effect in a particular manner, this disclosure contemplates receiving a request for downloading an AR effect in any suitable manner.

At step 120, the system may select a first subset of elements among the plurality of elements. In particular embodiments, the system may select the first subset of elements based on one or more predefined rules. In particular embodiments, the system may select the first subset of elements based on a processing speed of the client device (e.g., mobile devices with low-end processors may first receive simpler elements so that those elements may be quickly rendered and displayed to the user). In particular embodiments, the system may select the first subset of elements based on a predefined configuration set by the user of the client device. The predefined configuration may be associated with a display quality of the AR effect. As an example and not by way of limitation, the user may choose to download the AR effects in high resolution format only. As another example and not by way of limitation, the user may choose to display the AR effect in low resolution format due to network bandwidth limitations. As yet another example and not by way of limitation, the user may choose to display the AR effect in low resolution due to device storage limitations. Based on the specified user preference, the system may select suitable elements. In particular embodiments, the system may select the first subset of elements based on those elements being predetermined as default elements. In particular embodiments, the default elements may be predetermined by the online social network 460. As an example and not by way of limitation, the system may determine the default elements based on how immediate those elements may be needed to display. Although this disclosure describes selecting a first subset of elements among the plurality of elements in a particular manner, this disclosure contemplates selecting a first subset of elements among the plurality of elements in any suitable manner.

At step 130, the system may transmit the first subset of elements to the client device for display. The first subset of elements may be transmitted in response to a request for downloading from the client device of the user. In particular embodiments, the system may launch the AR effect by displaying at least one element of the first subset of elements upon downloading, prior to a remaining subset of elements is received by the client device. In particular embodiments, the AR effect may include a plurality of effect components, where each effect component may include one or more of the plurality of elements. In particular embodiments, at least one element in the first subset of elements may be selected based on the element being shared among two or more of the plurality of effect components. Although this disclosure describes transmitting a first subset of elements to the client device for display in a particular manner, this disclosure contemplates transmitting a first subset of elements to the client device for display in any suitable manner.

At step 140, the system may transmit, after the transmitting of the first subset of elements is complete, a remaining subset of elements of the plurality of elements to the client device for display. The system may transmit the remaining subset of elements after transmitting of the first subset of elements is complete. In particular embodiments, the augmented reality effect may be configured to launch and display at least one element of the first subset of elements prior to the remaining subset of elements is received by the client device. Although this disclosure describes transmitting a subset of elements of the plurality of elements to the client device in a particular manner, this disclosure contemplates transmitting a subset of elements of the plurality of elements to the client device in any suitable manner.

In particular embodiments, the AR effect may be configured to have a default view and at least one element in the first subset of elements may be selected based on element being configured to appear in the default view.

In particular embodiments, the client device may include a first camera and a second camera, in which a first element of the plurality of elements may be configured to be visible with a scene captured by the first camera of the client device. In particular embodiments, the first element may be selected as one of the first subset of elements based on a determination that the first camera of the client device is enabled.

In particular embodiments, the AR effect may comprise a plurality of effect components. Each effect component may include one or more of the plurality of elements. In particular embodiments, at least one element in the first subset of elements may be selected based on the element being part of one of the plurality of effect components that a machine-learning model may predict to be presented to a user of the client device.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for incrementally distributing AR effect elements including the particular steps of the method of FIG. 1, this disclosure contemplates any suitable method for incrementally distributing AR effect elements, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Particular embodiments described herein relates to systems and methods for releasing an AR effect to devices with sufficient capabilities to support the AR effect. At a high level, a distribution system for AR effects may evaluate the performance of an AR effect prior to releasing the AR effect to users. In particular embodiments, the AR effect may be made available to a subset of users/devices for evaluation purposes. The data relating to performance of the AR effect may be gathered by a server. In particular embodiments, a machine-learning algorithm or a rule-based algorithm may then extrapolate the performance of the AR effect to determine whether to send the AR effect back to a developer to fix the issues or limit the AR effect availability to a certain class of devices that can handle the AR effect.

In particular embodiments, the system may first release the AR effect to a relatively small population of users (e.g., 1%, 1%, 0.01%, etc.) with high-end devices and if the AR effect performs above a predefined threshold, then the AR effect may be rolled out to the next subset of devices (i.e., devices with lower quality). For example, the system may access a collection of device-capability data or a ranked list of devices based on capabilities. For instance, devices A, B, and C may be classified as high-end devices, devices D and E may be classified as mid-end devices, and devices F and G may be classified as low-end devices. In particular embodiments, the system may select one or more devices (e.g., those in the high-end category) and make the AR effect available to individual users with such devices. In particular embodiments, the system may make the AR effect available to a select subgroup of users with such devices (e.g., randomly selected 0.1% of the users who have such devices). In particular embodiments, the system may alternatively access its stored information relating to its users and their devices and rank those devices based on capability. The AR effect may be made available to a subgroup of those users with the highest rank, for example.

In particular embodiments, the initial set of client devices who have downloaded and used the AR effect may measure the performance of the AR effect and send related data back to the system for evaluation. In particular embodiments, performance of AR effects may be measured using different metrics, such as frame drops, average time for rending each frame, user survey/feedback, among others. For example, a client-side application running the AR effect may count the frame rate of an AR over a predetermined period of time (e.g., 1, 3, 10, 50 seconds) and compare that rate with an expected rate to determine the number of frames that were dropped. For example, over the course of 1 second, if the measured number of frames is 25 and the expected number of frames is 30, then the frame drop measure may be 5. The application may send the frame-drop data (or any other metric) to a server of the system, which in turn may determine whether the AR effect's performance is acceptable or not. In particular embodiments, the application may also send additional contextual data describing the particular environment in which the AR effect ran. For example, the contextual data may include the device's battery level (since low battery may trigger some devices to throttle down performance or disable certain optimization features/hardware), memory utilization, processor utilization, concurrently running apps/operations, etc. The additional information may be used by the system to weigh the performance measure. For example, a high frame drop count while a device is operating in battery-saving mode may receive a lesser weight, since it is relatively less common for a device to be operating under the battery threshold level that triggers the battery-saving mode.

In particular embodiments, the system may use an evaluation algorithm to analyze the performance measures (e.g., number of frames that are being dropped) of a certain subset of device. If the performance measure is sufficient (e.g., the number of frame drops is sufficiently low) relative to a benchmark, the system may determine that the AR effect can be adequately supported by the class of devices and make the AR effect generally available to all devices of that class. In particular embodiments, the system may then test how well the AR effect would perform on the next class of devices (e.g., if the initial devices are designated as high-end, the next class of devices may be mid-end devices). For example, the system may again make the AR effect to a subgroup of devices in the next capability class and evaluate their performance measures to determine whether to make the AR effect generally available to devices in that class. This process may continue until devices in a particular class fail the threshold performance requirement. For example, if the number of frame drops rises above a threshold, then the system may determine that the AR effect is not suitable for the particular class of devices and not generally release the AR effect to devices in that class. In particular embodiments, the system may also cease examining whether lower classes of devices can adequately support the AR effect.

In particular embodiments, even when an AR effect performs below the threshold, the effect may still be acceptable to some users. For example, users may continue to use an AR effect despite its poor performance. In particular embodiments, a machine-learning model may be trained to predict whether a given user is likely to accept poor performance based on, e.g., whether the user uses other AR effects that perform poorly, the user's geographic location (e.g., the general tolerance level in certain countries may be higher due to, e.g., lower expectations from lower-end devices), device capabilities, user profile information (e.g., age), etc. In particular embodiments, when a user requests the system for available AR effects, the system may determine that the user's device is of a device class that is unlikely to provide sufficient performance. Rather than simply not displaying or making the AR effect available for download, the system may further analyze whether the particular requesting user may find lower performance acceptable. For example, the system may access the user's data (e.g., profile and social graph data from a social-networking system) and predict, using the machine-learning model trained on other users, whether the user is likely to find the AR effect's likely performance on the user's device acceptable. In particular embodiments, the system may further base its determination on the estimated performance measure (e.g., frame drops) that the user is likely to experience and predict whether that would be acceptable to the user (e.g., a user may tolerate at most 4 frame drops per second). If the user is likely to tolerate suboptimal performance, the system may make the AR effect available for download to that user despite the user's device being in an insufficient device class.

In particular embodiments, the system may determine a second performance score for the AR effect among the second subset of client devices. The system may determine that the second performance score does not satisfy the predefined threshold. In particular embodiments, the system may not transmit the AR effect to a third subset of client devices based on the second performance score, where the third subset of client devices may have a third particular ranking among the plurality of client devices. The third particular ranking of the third subset of client devices may not be higher than the second particular ranking of the second subset of client devices. As an example and not by way of limitation, the system may transmit the AR effect to a third subset of client devices, where the second particular ranking of the second subset of client devices is higher than the third particular ranking of the third subset of client devices. As another example and not by way of limitation, the system may transmit the AR effect to a third subset of client devices, where the second particular ranking of the second subset of client devices and the third particular ranking of the third subset of client devices are the same.

In particular embodiments, the system may determine a second performance score for the AR effect among the second subset of client devices. The system may determine that the second performance score does not satisfy the predefined threshold. In particular embodiments, the system may identify a third subset of client devices having a third particular ranking among the plurality of client devices that may not be higher than the second particular ranking of the second subset of client devices. The system may select client devices in the third subset of client devices using a machine-learning model. The machine learning model may be configured to predict whether a user of a client device in the third subset of client devices is likely to tolerate the augmented reality effect performing with suboptimal quality.

The system may transmit the AR effect to the selected client devices in the third subset of client devices.

Figure 2:
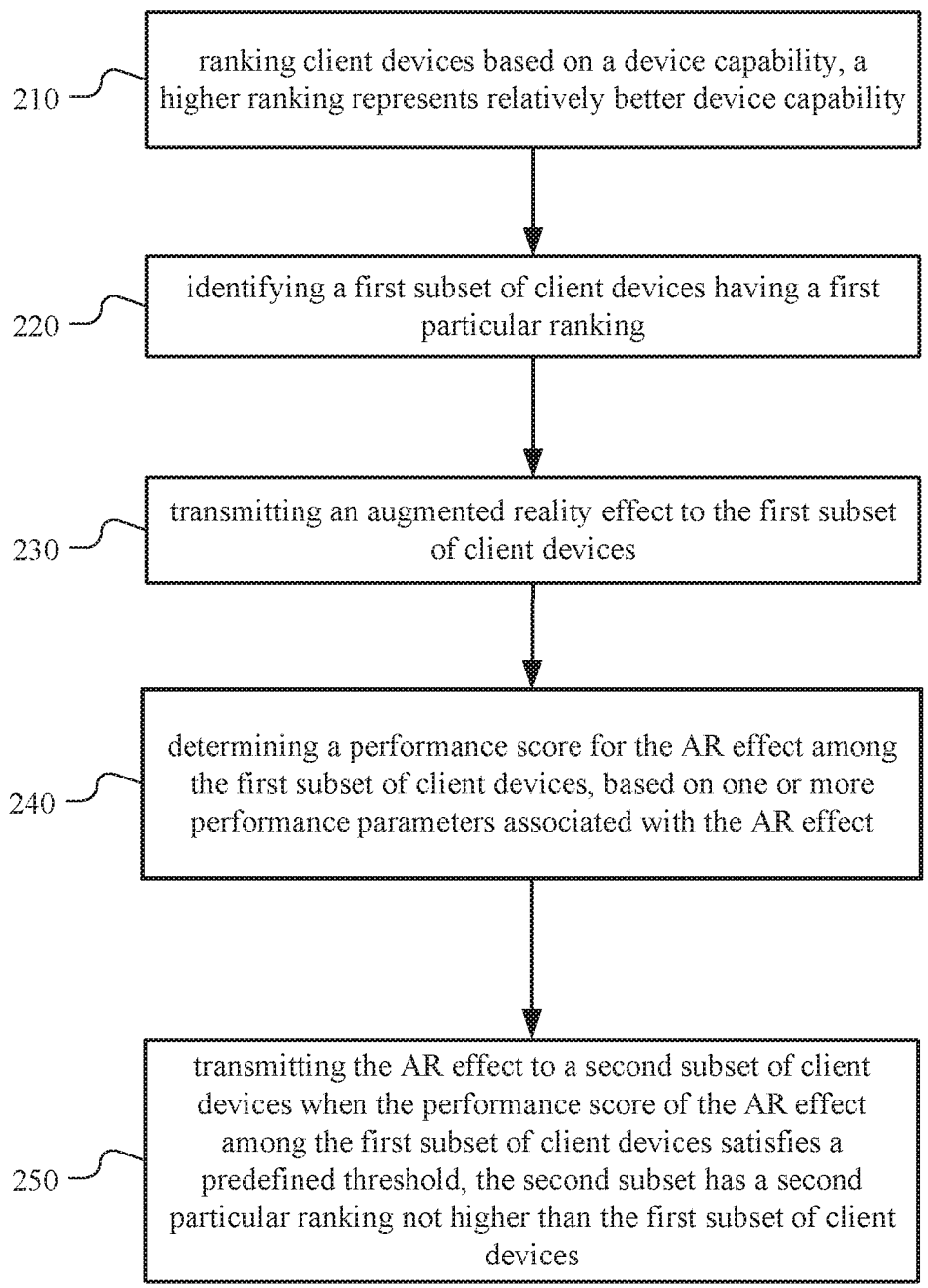
FIG. 2 illustrates an example method for distributing AR effects to capable devices.

FIG. 2 illustrates an example method 200 for staged-rolling out of an AR effect. The method may begin at step 210, where the system may rank a plurality of client devices based on a device capability associated with each of the plurality of client devices. A higher ranking may represent relatively better device capability. As an example and not by way of limitation, the system may rank the client devices based on their processing speed, processor (CPU, GPU, etc.) class, memory, etc. Although this disclosure describes ranking a plurality of client devices in a particular manner, this disclosure contemplates ranking a plurality of client devices in any suitable manner.

At step 220, the system may identify a first subset of client devices among the plurality of client devices. The first subset of client devices may have a first particular ranking among the plurality of client devices. As an example and not by way of limitation, the system may identify a subset of client devices with a particular CPU class as the first subset of client devices. Although this disclosure describes identifying a subset of client devices in a particular manner, this disclosure contemplates identifying a subset of client devices in any suitable manner.

At step 230, the system may transmit an augmented reality effect to the first subset of client devices. In particular embodiments, the system may transmit the AR effect only to the first subset of client devices. As an example and not by way of limitation, the system may transmit the AR effect to only a subset of client devices with a particular CPU class. Although this disclosure describes transmitting an augmented reality effect to a subset of client devices in a particular manner, this disclosure contemplates transmitting an augmented reality effect to a subset of client devices in any suitable manner.

At step 240, the system may determine a performance score for the augmented reality effect among the first subset of client devices, the performance score being calculated based on one or more performance parameters associated with the augmented reality effect running on the first subset of client devices. In particular embodiments, the system may access data associated with the one or more performance parameters of an AR effect on the client device of a user of the AR effect. Although this disclosure describes determining a performance score for the augmented reality effect in a particular manner, this disclosure contemplates determining a performance score for the augmented reality effect in any suitable manner.

At step 250, the system may transmit the AR effect to a second subset of client devices when the performance score of the AR effect among the first subset of client devices satisfies a predefined threshold. In particular embodiments, the second subset of client devices may have a second particular ranking among the plurality of client devices. In particular embodiments, the second particular ranking of the second subset of client devices is not higher than the first particular ranking of the first subset of client devices. As an example and not by way of limitation, the system may transmit the AR effect to a second subset of client devices, where the first particular ranking of the first subset of client devices is higher than the second particular ranking of the second subset of client devices. As another example and not by way of limitation, the system may transmit the AR effect to a second subset of client devices, where the first particular ranking of the first subset of client devices and the second particular ranking of the second subset of client devices are the same (e.g., the second subset may be the remaining population of users in that class). In particular embodiments, the system may identify the second subset of client devices by using a machine-learning model. The machine-learning model may be configured to take as input the performance score and one or more features associated with the second subset of client devices and output a performance prediction of the AR effect running on the second subset of client devices. Although this disclosure describes transmitting an AR effect to a second subset of client devices in a particular manner, this disclosure contemplates transmitting an AR effect to a second subset of client devices in any suitable manner.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for staged-rolling out of an AR effect including the particular steps of the method of FIG. 2, this disclosure contemplates any suitable method for staged-rolling out of an AR effect including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
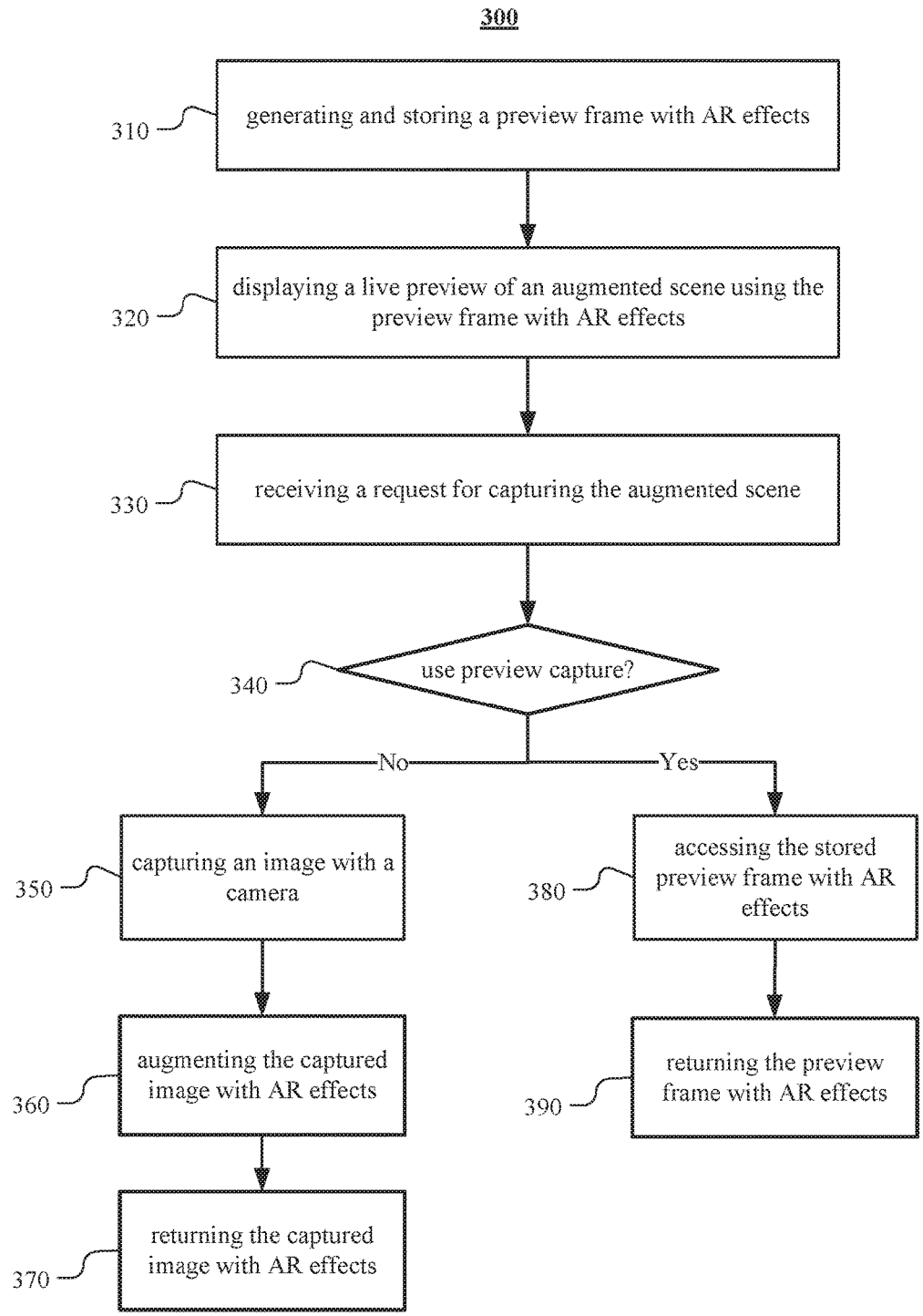
FIG. 3 illustrates an example method for capturing an image or video of an AR scene.

Particular embodiments described herein relates to an AR application with a smart capture feature that may cause a desired image or video that is augmented with AR effects to be saved using either the aforementioned native capture mode or preview capture mode. FIG. 3 illustrates an example method 300 for capturing an image or video of an AR scene. The AR application in operation may provide a live preview of an augmented image/video. To generate the live preview, the AR application at step 310 may request the device's camera interface to capture and provide a stream of frames to be used in the live preview, thereby providing the user with a live scene as seen by the camera. In particular embodiments, these frames used for preview purposes may be of lower quality than a photo capture operation. For example, the resolution of a preview frame may be similar to the display resolution (e.g., 1334-by-750-pixels), whereas the resolution of a regular photo capture may be more than 12 megapixels. The AR application may apply any effects (e.g., AR effects) to the preview frames to generate preview frames with AR effects. In particular embodiments, these preview frames with AR effects may be saved (e.g., in RAM, cache, disk drive, etc.) according to any suitable storage rule. For example, the last 1, 2, 5, 30, or any suitable number of frames may be saved temporarily on a first-in-first-out basis. At step 320, the preview frames with AR effects may be used to provide the user with a live preview of an augmented scene. The user may thus see a live camera preview with AR effects.

At step 330, the AR application may receive a request from the user to save a desired image or video with AR effects, as shown in the live preview. In particular embodiments, the AR application may provide the user with control elements (e.g., a virtual button(s), physical button(s), gestures, etc.) that allow the user to trigger a capture. In particular embodiments, the capture operation may be a native capture, a preview capture, or a smart capture that automatically decides whether to use native or preview capture. As an example, at step 340, the AR application may automatically determine whether to use native capture or preview capture.

In particular embodiments, when operating in native capture mode, the AR application may, in response to the user's command, request the device's camera to capture a real-world scene (e.g., step 350). In particular embodiments, this image capturing operation may be in addition and subsequent to the earlier capture operation for obtaining the preview frames for generating the live preview. The quality of the captured image (which may be a frame of a video) may be as good as the image/video quality offered by the device. For example, the resolution of the natively captured image may be the maximum offered by the camera (e.g., 12 megapixels). The AR application may then augment this image with AR effects (e.g., step 360). The augmented image with AR effects may be returned to the user who requested it (e.g., step 370), and may be saved locally or remotely and/or shared with others. Compared to the preview capture mode, described in further detail below, the native capture mode provides higher quality augmented images/videos, but at the cost of additional processing (e.g., image capture and applying AR effects), larger file size, and associated time.

The preview capture mode provides an alternative that trades image quality for faster processing and reduced file size. In particular embodiments, when operating in preview capture mode, the AR application may, in response to the user command to capture an image/video with AR effects, save the augmented preview frame that was generated for the live preview. As described elsewhere in this application, the AR application in particular embodiments may obtain lower quality preview frames from the camera interface and apply AR effects to them. The augmented preview frames may be saved and displayed as a live preview of the AR scene. When preview capture is used to save an AR scene, the AR application may access the previously-generated augmented preview frames used for the live preview (e.g., step 380) and return it to the requesting user (e.g., step 390). To the end user, the result may be similar to a screenshot of the live preview, but the saved AR scene would not include any of the application's UI or any other elements that are not part of the AR scene. For example, if the UI of the AR application has a shutter button, flash button, menu options, etc., they would not be included in the saved AR scene. Further, in particular embodiments the saved AR scene may not depend on the screen's resolution, which would be the case for an actual screen capture. For example, an augmented preview frame may be slightly larger than the device's screen, and as such the saved AR scene may have a higher resolution than that of the device screen. Since the preview capture operation reuses the previously-generated preview frame, it avoids the additional work performed under the native capture mode, such as capturing a new image and applying AR effects to it. The preview capture mode therefore provides slower devices with an alternative capturing method with reduced processing, storage, and/or transmission needs.

In particular embodiments, the decision to utilize preview capture mode or native capture mode (e.g., at step 340) may be determined on the client device. In particular embodiments, this decision may instead be determined by a server. In particular embodiments, a machine-learning algorithm may be trained to understand the users' preferences and to predict which capturing mode is likely preferable to the user. For example, a machine-learning model may be trained based on labeled sets of user features. For instance, a training system may access features associated with a particular user, such as, e.g., the user's age, geographic location, gender, device type/class, available memory, network carrier, video content purchasing history (e.g., whether the user purchases/rents standard definition or high definition content), and any other suitable information that may signal a user's preference for one capturing mode over the other. The particular user's explicit preference with respect to whether preview capture is acceptable may also be known. Based on such data, the machine-learning model may be trained to predict whether a given user is likely to find preview capture acceptable. In particular embodiments, situational preferences that may change (e.g., bandwidth or storage limitation, whether the photo is being shared via social media or texting, etc.) may be used by the machine-learning algorithm to determine which capturing mode should be used. For example, when the device storage is almost full, or when the user is in an area with low coverage (e.g., in a national park, in a distant location far away from a city, etc.), the smart capture module may determine that the user would likely prefer to use preview capture. As another example, a user may prefer high-quality captures when he intends to upload it to a social-networking system, whereas a low-quality capture may suffice when he intends to send it to a friend via text message. Thus, in particular embodiments, a machine-learning model may further be trained based on features associated with users' image-quality preferences in different use cases (e.g., uploading an image to a social-networking system, sending it over email, sending it over a messaging system, not do anything and just having it stored, etc.). The machine-learning model may also consider other situational features, such as a user's wireless speed, relationship with the particular recipient of the captured image (e.g., based on degrees of separation within a social network), and other features associated with particular captures and/or transmissions of an AR scene.

In particular embodiments, explicit preferences set by the user may determine which capturing mode should be used. For example, when a user chooses to capture and upload photos only in high resolution format, the photos may be taken only in native capture mode. Similarly, a user may indicate that low resolution is preferred, in which case preview capture may be used. In particular embodiments, mode selection may also depend on preferences or characteristics of recipients of the captured scene. For example, if a recipient prefers to render and display low quality photos on his device, the user's device may be informed of such preference by the recipient's device or by a server so that preview capture mode is used.

In particular embodiments, the server may select a photo capturing mode by accessing feedback from other users who saw the user's photos. For example, if the photo is posted or shared with friends of the user on an online social network, the server (or the user's client device) may base its selection of future photo capturing mode on whether the friends of the user interacted with the posted/shared photo. When friends of the user interacted more (e.g., liked or commented on the photos more) with photos with high quality (e.g., taken in native capture mode) compared to lower quality photos (e.g., taken in preview capture mode), the machine-learning algorithm may cause the user's device to take photos in native capture mode in the future. On the other hand, if there appears to be no significant difference between interactions garnered by high quality versus low quality photos, the algorithm may place relatively more weight on using preview capture.

Figure 4:
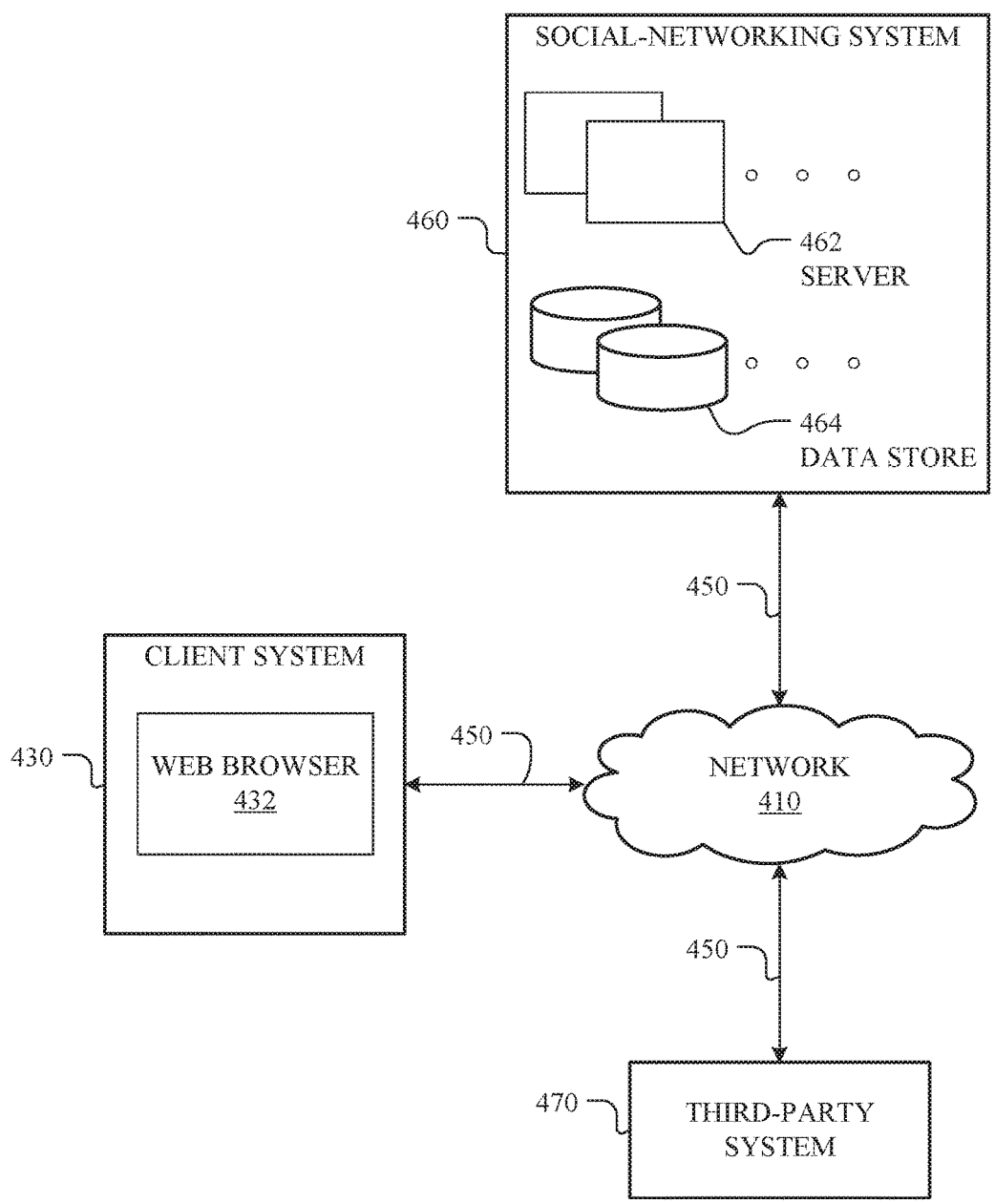
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of a client system 430, a social-networking system 460, a third-party system 470, and a network 410, this disclosure contemplates any suitable arrangement of a client system 430, a social-networking system 460, a third-party system 470, and a network 410. As an example and not by way of limitation, two or more of a client system 430, a social-networking system 460, and a third-party system 470 may be connected to each other directly, bypassing a network 410. As another example, two or more of a client system 430, a social-networking system 460, and a third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client systems 430, social-networking systems 460, third-party systems 470, and networks 410.

This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect a client system 430, a social-networking system 460, and a third-party system 470 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

In particular embodiments, a client system 430 may be an electronic device including hardware, software, or embedded logic components or a combination of two or more such components and capable of carrying out the appropriate functionalities implemented or supported by a client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 430. A client system 430 may enable a network user at a client system 430 to access a network 410. A client system 430 may enable its user to communicate with other users at other client systems 430.

In particular embodiments, a client system 430 may include a web browser 430402, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 430 may enter a Uniform Resource Locator (URL) or other address directing a web browser 430402 to a particular server (such as server 362, or a server associated with a third-party system 470), and the web browser 430402 may generate a Hyper Text Transfer Protocol (HTTP) request and communicate the HTTP request to server. The server may accept the HTTP request and communicate to a client system 430 one or more Hyper Text Markup Language (HTML) files responsive to the HTTP request. The client system 430 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 460 may be a network-addressable computing system that can host an online social network. The social-networking system 460 may generate, store, receive, and send social-networking data, such as, for example, user-profile data, concept-profile data, social-graph information, or other suitable data related to the online social network. The social-networking system 460 may be accessed by the other components of network environment 400 either directly or via a network 410. As an example and not by way of limitation, a client system 430 may access the social-networking system 460 using a web browser 430402, or a native application associated with the social-networking system 460 (e.g., a mobile social-networking application, a messaging application, another suitable application, or any combination thereof) either directly or via a network 410. In particular embodiments, the social-networking system 460 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, the social-networking system 460 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 364.

In particular embodiments, the social-networking system 460 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. The social-networking system 460 may provide users of the online social network the ability to communicate and interact with other users. In particular embodiments, users may join the online social network via the social-networking system 460 and then add connections (e.g., relationships) to a number of other users of the social-networking system 460 whom they want to be connected to. Herein, the term "friend" may refer to any other user of the social-networking system 460 with whom a user has formed a connection, association, or relationship via the social-networking system 460.

In particular embodiments, the social-networking system 460 may provide users with the ability to take actions on various types of items or objects, supported by the social-networking system 460. As an example and not by way of limitation, the items and objects may include groups or social networks to which users of the social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 460 or by an external system of a third-party system 470, which is separate from the social-networking system 460 and coupled to the social-networking system 460 via a network 410.

In particular embodiments, the social-networking system 460 may be capable of linking a variety of entities. As an example and not by way of limitation, the social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating the social-networking system 460. In particular embodiments, however, the social-networking system 460 and third-party systems 470 may operate in conjunction with each other to provide social-networking services to users of the social-networking system 460 or third-party systems 470. In this sense, the social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 460 also includes user-generated content objects, which may enhance a user's interactions with the social-networking system 460. User-generated content may include anything a user can add, upload, send, or "post" to the social-networking system 460. As an example and not by way of limitation, a user communicates posts to the social-networking system 460 from a client system 430. Posts may include data such as status updates or other textual data, location information, photos, videos, links, music or other similar data or media. Content may also be added to the social-networking system 460 by a third-party through a "communication channel," such as a newsfeed or stream.

In particular embodiments, the social-networking system 460 may include a variety of servers, sub-systems, programs, modules, logs, and data stores. In particular embodiments, the social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 460 may also include suitable components such as network interfaces, security mechanisms, load balancers, failover servers, management-and-network-operations consoles, other suitable components, or any suitable combination thereof. In particular embodiments, the social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 460 to one or more client systems 430 or one or more third-party systems 470 via a network 410. The web server may include a mail server or other messaging functionality for receiving and routing messages between the social-networking system 460 and one or more client systems 430. An API-request server may allow a third-party system 470 to access information from the social-networking system 460 by calling one or more APIs. An action logger may be used to receive communications from a web server about a user's actions on or off the social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from a client system 430 responsive to a request received from a client system 430. Authorization servers may be used to enforce one or more privacy settings of the users of the social-networking system 460. A privacy setting of a user determines how particular information associated with a user can be shared. The authorization server may allow users to opt in to or opt out of having their actions logged by the social-networking system 460 or shared with other systems (e.g., a third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
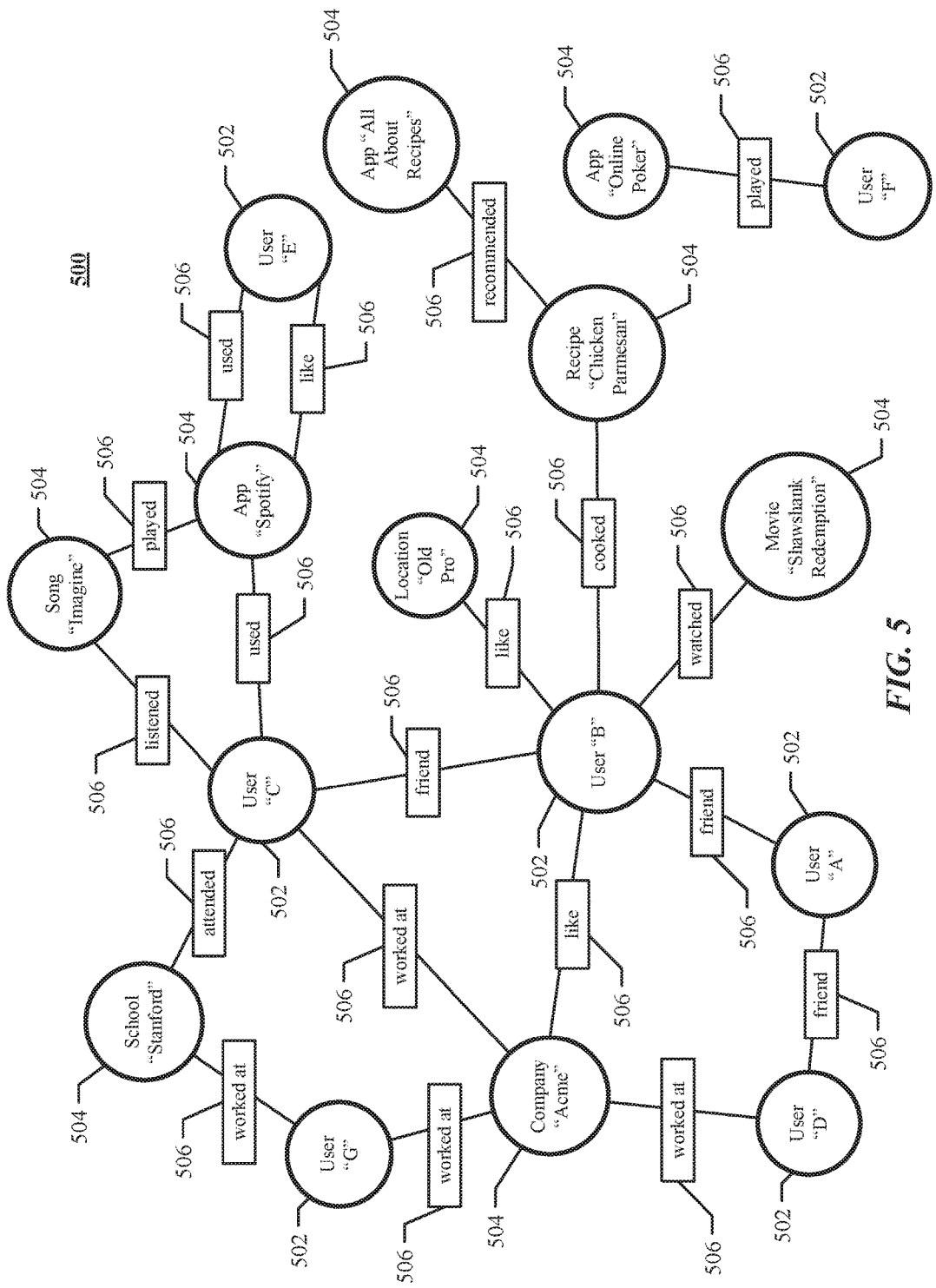
FIG. 5 illustrates an example social graph.

FIG. 5 illustrates an example social graph 500. In particular embodiments, the social-networking system 460 may store one or more social graphs 500 in one or more data stores. In particular embodiments, the social graph 500 may include multiple nodes—which may include multiple user nodes 502 or multiple concept nodes 504—and multiple edges 506 connecting the nodes. The example social graph 500 illustrated in FIG. 2 is shown, for didactic purposes, in a two-dimensional visual map representation. In particular embodiments, a social-networking system 460, a client system 430, or a third-party system 470 may access the social graph 500 and related social-graph information for suitable applications. The nodes and edges of the social graph 500 may be stored as data objects, for example, in a data store (such as a social-graph database). Such a data store may include one or more searchable or queryable indexes of nodes or edges of the social graph 500.

In particular embodiments, a user node 502 may correspond to a user of the social-networking system 460. As an example and not by way of limitation, a user may be an individual (human user), an entity (e.g., an enterprise, business, or third-party application), or a group (e.g., of individuals or entities) that interacts or communicates with or over the social-networking system 460. In particular embodiments, when a user registers for an account with the social-networking system 460, the social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with the social-networking system 460. In particular embodiments, a user node 502 may be associated with information provided by a user or information gathered by various systems, including the social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more web interfaces.

In particular embodiments, a concept node 504 may correspond to a concept. As an example and not by way of limitation, a concept may correspond to a place (such as, for example, a movie theater, restaurant, landmark, or city); a website (such as, for example, a website associated with the social-networking system 460 or a third-party website associated with a web-application server); an entity (such as, for example, a person, business, group, sports team, or celebrity); a resource (such as, for example, an audio file, video file, digital photo, text file, structured document, or application) which may be located within the social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including the social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more web interfaces.

In particular embodiments, a node in the social graph 500 may represent or be represented by a web interface (which may be referred to as a "profile interface"). Profile interfaces may be hosted by or accessible to the social-networking system 460. Profile interfaces may also be hosted on third-party websites associated with a third-party system 470. As an example and not by way of limitation, a profile interface corresponding to a particular external web interface may be the particular external web interface and the profile interface may correspond to a particular concept node 504. Profile interfaces may be viewable by all or a selected subset of other users. As an example and not by way of limitation, a user node 502 may have a corresponding user-profile interface in which the corresponding user may add content, make declarations, or otherwise express himself or herself. As another example and not by way of limitation, a concept node 504 may have a corresponding concept-profile interface in which one or more users may add content, make declarations, or express themselves, particularly in relation to the concept corresponding to concept node 504.

In particular embodiments, a concept node 504 may represent a third-party web interface or resource hosted by a third-party system 470. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 430 to send to the social-networking system 460 a message indicating the user's action. In response to the message, the social-networking system 460 may create an edge (e.g., a check-in-type edge) between a user node 502 corresponding to the user and a concept node 504 corresponding to the third-party web interface or resource and store edge 506 in one or more data stores.

In particular embodiments, a pair of nodes in the social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, the social-networking system 460 may send a "friend request" to the second user. If the second user confirms the "friend request," the social-networking system 460 may create an edge 506 connecting the first user's user node 502 to the second user's user node 502 in the social graph 500 and store edge 506 as social-graph information in one or more of data stores 364. In the example of FIG. 5, the social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or a subtype. A concept-profile interface corresponding to a concept node 504 may include, for example, a selectable "check in" icon (such as, for example, a clickable "check in" icon) or a selectable "add to favorites" icon. Similarly, after a user clicks these icons, the social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, the social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, the social-networking system 460 may create an edge 506 between a user node 502 and a concept node 504 in the social graph 500. As an example and not by way of limitation, a user viewing a concept-profile interface (such as, for example, by using a web browser or a special-purpose application hosted by the user's client system 430) may indicate that he or she likes the concept represented by the concept node 504 by clicking or selecting a "Like" icon, which may cause the user's client system 430 to send to the social-networking system 460 a message indicating the user's liking of the concept associated with the concept-profile interface. In response to the message, the social-networking system 460 may create an edge 506 between user node 502 associated with the user and concept node 504, as illustrated by "like" edge 506 between the user and concept node 504. In particular embodiments, the social-networking system 460 may store an edge 506 in one or more data stores. In particular embodiments, an edge 506 may be automatically formed by the social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Figure 6:
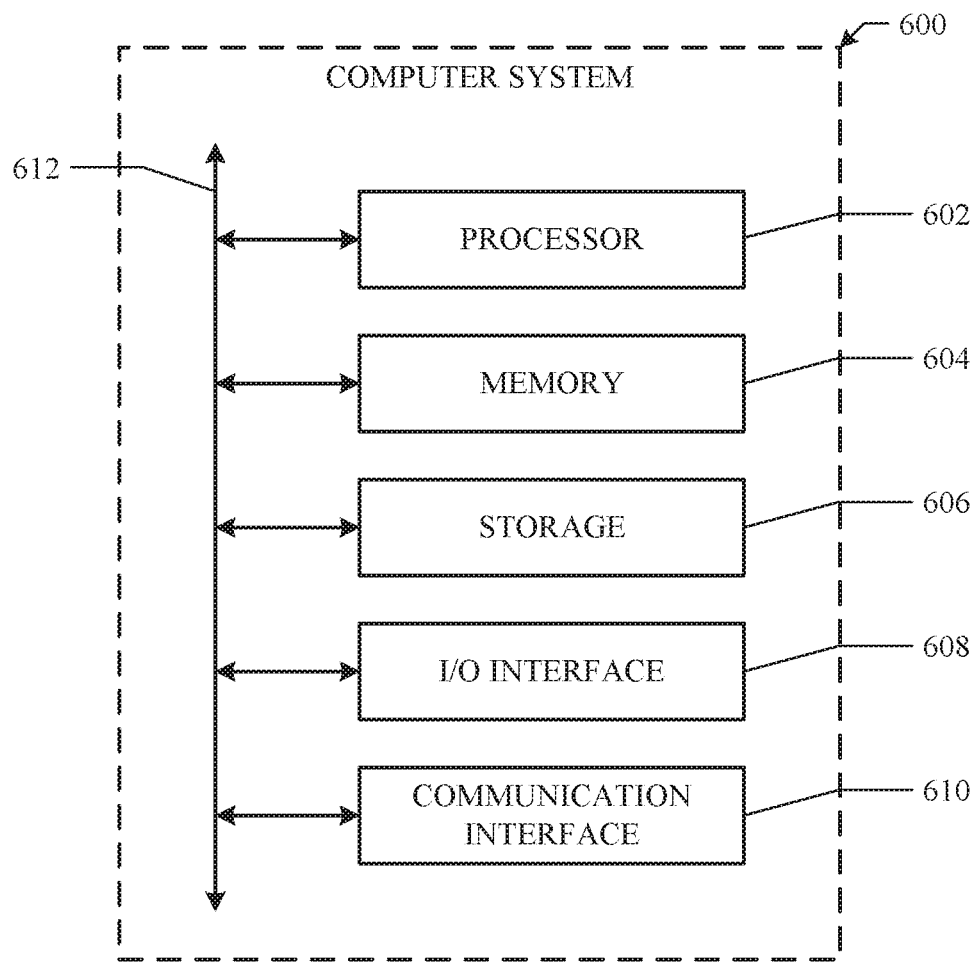
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 606, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 606 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 606 for them. Where appropriate, I/O interface 606 may include one or more device or software drivers enabling processor 602 to drive one or more of these I/O devices. I/O interface 606 may include one or more I/O interfaces 606, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by one or more computing devices, comprising:
   ranking a plurality of client devices based on a device capability associated with each of the plurality of client devices, wherein a higher ranking represents relatively better device capability;
   identifying a first subset of client devices among the plurality of client devices, the first subset of client devices having a first particular ranking among the plurality of client devices;
   transmitting an augmented reality effect to the first subset of client devices;
   determining a performance score for the augmented reality effect among the first subset of client devices, the performance score being calculated based on one or more performance parameters associated with the augmented reality effect running on the first subset of client devices; and
   transmitting the augmented reality effect to a second subset of client devices among the plurality of client devices when the performance score of the augmented reality effect among the first subset of client devices satisfies a predefined threshold, wherein the second subset of client devices has a second particular ranking among the plurality of client devices, wherein the second particular ranking of the second subset of client devices is less than or equal to the first particular ranking of the first subset of client devices, wherein the second subset of client devices is different from the first subset of client devices.

2. The method of claim 1, further comprising:
   identifying the second subset of client devices using a machine-learning model, the machine-learning model being configured to take as input the performance score and one or more features associated with the second subset of client devices; and
   outputting a performance prediction of the augmented reality effect running on the second subset of client devices.

3. The method of claim 1, wherein the one or more performance parameters comprise a frame-drop of the augmented reality effect measured by each of the first subset of client devices.

4. The method of claim 1, wherein the first particular ranking of the first subset of client devices and the second particular ranking of the second subset of client devices are the same.

5. The method of claim 1, wherein the first particular ranking of the first subset of client devices is higher than the second particular ranking of the second subset of client devices.

6. The method of claim 5, further comprising:
   determining a second performance score for the augmented reality effect among the second subset of client devices; and
   determining that the second performance score does not satisfy the predefined threshold; and
   blocking the augmented reality effect from being transmitted to a third subset of client devices based on the second performance score, wherein the third subset of client devices has a third particular ranking among the plurality of client devices, wherein the third particular ranking of the third subset of client devices is less than or equal to the second particular ranking of the second subset of client devices.

7. The method of claim 5, further comprising:
   determining a second performance score for the augmented reality effect among the second subset of client devices;
   determining that the second performance score does not satisfy the predefined threshold;
   identifying a third subset of client devices having a third particular ranking among the plurality of client devices that is less than or equal to the second particular ranking of the second subset of client devices;

selecting client devices in the third subset of client devices using a machine-learning model, the machine learning model being configured to predict whether a user of a client device in the third subset of client devices is likely to tolerate the augmented reality effect performing with suboptimal quality; and transmitting the augmented reality effect to the selected client devices in the third subset of client devices.

8. One or more computer-readable non-transitory storage media embodying software that is operable when executed to:

rank a plurality of client devices based on a device capability associated with each of the plurality of client devices, wherein a higher ranking represents relatively better device capability;

identify a first subset of client devices among the plurality of client devices, the first subset of client devices having a first particular ranking among the plurality of client devices;

transmit an augmented reality effect to the first subset of client devices;

determine a performance score for the augmented reality effect among the first subset of client devices, the performance score being calculated based on one or more performance parameters associated with the augmented reality effect running on the first subset of client devices; and transmit the augmented reality effect to a second subset of client devices among the plurality of client devices when the performance score of the augmented reality effect among the first subset of client devices satisfies a predefined threshold, wherein the second subset of client devices has a second particular ranking among the plurality of client devices, wherein the second particular ranking of the second subset of client devices is less than or equal to the first particular ranking of the first subset of client devices, wherein the second subset of client devices is different from the first subset of client devices.

9. The media of claim 8, wherein the software is further operable when executed to:

identify the second subset of client devices using a machine-learning model, the machine-learning model being configured to take as input the performance score and one or more features associated with the second subset of client devices; and output a performance prediction of the augmented reality effect running on the second subset of client devices.

10. The media of claim 8, wherein the one or more performance parameters comprise a frame-drop of the augmented reality effect measured by each of the first subset of client devices.

11. The media of claim 8, wherein the first particular ranking of the first subset of client devices and the second particular ranking of the second subset of client devices are the same.

12. The media of claim 8, wherein the first particular ranking of the first subset of client devices is higher than the second particular ranking of the second subset of client devices.

13. The media of claim 12, wherein the software is further operable when executed to:

determine a second performance score for the augmented reality effect among the second subset of client devices; and determine that the second performance score does not satisfy the predefined threshold; and block the augmented reality effect from being transmitted to a third subset of client devices based on the second performance score, wherein the third subset of client devices has a third particular ranking among the plurality of client devices, wherein the third particular ranking of the third subset of client devices is less than or equal to the second particular ranking of the second subset of client devices.

14. The media of claim 12, wherein the software is further operable when executed to:

determine a second performance score for the augmented reality effect among the second subset of client devices;

determine that the second performance score does not satisfy the predefined threshold;

identify a third subset of client devices having a third particular ranking among the plurality of client devices that is less than or equal to the second particular ranking of the second subset of client devices;

select client devices in the third subset of client devices using a machine-learning model, the machine learning model being configured to predict whether a user of a client device in the third subset of client devices is likely to tolerate the augmented reality effect performing with suboptimal quality; and transmit the augmented reality effect to the selected client devices in the third subset of client devices.

15. A system comprising: one or more processors; and a non-transitory memory coupled to the processors comprising instructions executable by the processors, the processors operable when executing the instructions to:

rank a plurality of client devices based on a device capability associated with each of the plurality of client devices, wherein a higher ranking represents relatively better device capability;

identify a first subset of client devices among the plurality of client devices, the first subset of client devices having a first particular ranking among the plurality of client devices;

transmit an augmented reality effect to the first subset of client devices;

determine a performance score for the augmented reality effect among the first subset of client devices, the performance score being calculated based on one or more performance parameters associated with the augmented reality effect running on the first subset of client devices; and transmit the augmented reality effect to a second subset of client devices among the plurality of client devices when the performance score of the augmented reality effect among the first subset of client devices satisfies a predefined threshold, wherein the second subset of client devices has a second particular ranking among the plurality of client devices, wherein the second particular ranking of the second subset of client devices is less than or equal to the first particular ranking of the first subset of client devices, wherein the second subset of client devices is different from the first subset of client devices.

16. The system of claim 15, wherein the software is further operable when executed by the processors to:

identify the second subset of client devices using a machine-learning model, the machine-learning model being configured to take as input the performance score and one or more features associated with the second subset of client devices; and output a performance prediction of the augmented reality effect running on the second subset of client devices.

17. The system of claim 15, wherein the one or more performance parameters comprise a frame-drop of the augmented reality effect measured by each of the first subset of client devices.

18. The system of claim 15, wherein the first particular ranking of the first subset of client devices is higher than the second particular ranking of the second subset of client devices.

19. The system of claim 18, wherein the software is further operable when executed by the processors to:
   determine a second performance score for the augmented reality effect among the second subset of client devices; and
   determine that the second performance score does not satisfy the predefined threshold; and
   block the augmented reality effect from being transmitted to a third subset of client devices based on the second performance score, wherein the third subset of client devices has a third particular ranking among the plurality of client devices, wherein the third particular ranking of the third subset of client devices is less than or equal to the second particular ranking of the second subset of client devices.

20. The system of claim 18, wherein the software is further operable when executed by the processors to:
   determine a second performance score for the augmented reality effect among the second subset of client devices;
   determine that the second performance score does not satisfy the predefined threshold;
   identify a third subset of client devices having a third particular ranking among the plurality of client devices that is less than or equal to the second particular ranking of the second subset of client devices;
   select client devices in the third subset of client devices using a machine-learning model, the machine learning model being configured to predict whether a user of a client device in the third subset of client devices is likely to tolerate the augmented reality effect performing with suboptimal quality; and
   transmit the augmented reality effect to the selected client devices in the third subset of client devices.

* * * * *